Figure 1:
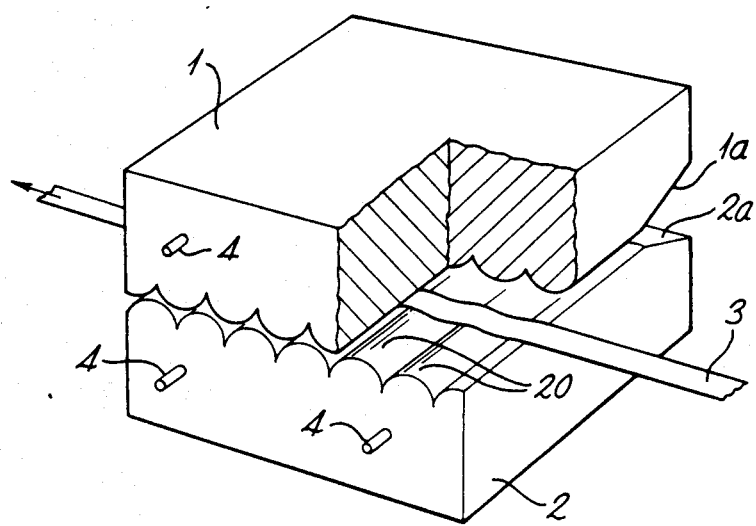

United States Patent [19]

Ruddell

[11] Patent Number: 4,861,249
[45] Date of Patent: Aug. 29, 1989

[54] APPARATUS FOR THERMALLY TREATING TAPE

[75] Inventor: James N. Ruddell, Craigavon, Ireland

[73] Assignee: National Research Development Corporation, London, England

[21] Appl. No.: 169,089

[22] Filed: Mar. 18, 1988

Related U.S. Application Data

[63] Continuation-in-part of Ser. No. 144,718, Jan. 14, 1988, abandoned, which is a continuation of Ser. No. 887,102, Jun. 18, 1986, abandoned.

[30] Foreign Application Priority Data

Oct. 18, 1984 [GB] United Kingdom ................ 8426351

[51] Int. Cl.$^4$ ............................................. B29C 35/00
[52] U.S. Cl. .......................................... 425/66; 34/41; 34/152; 264/210.1; 264/210.8; 264/234; 264/288.4; 264/290.5; 264/345; 425/143; 425/297; 425/404; 425/445
[58] Field of Search ............... 264/290.5, 290.7, 210.5, 264/210.8, 103, 235, 235.6, 346, 146, 345, 234, 210.1, 288.4, 290.5; 34/18, 41, 152, 234; 925/445, 446, 66, 143, 297, 404

[56] References Cited

U.S. PATENT DOCUMENTS

| | | | |
|---|---|---|---|
| 2,384,990 | 9/1945 | French | 34/18 |
| 2,495,053 | 1/1950 | Conaway et al. | 34/152 |
| 2,674,809 | 4/1954 | Meienhofer | 34/152 |
| 3,720,002 | 3/1973 | Martin | 34/18 |
| 3,894,343 | 7/1975 | Pray et al. | 34/41 |
| 4,042,469 | 8/1977 | Bell et al. | 264/346 |
| 4,236,323 | 12/1980 | Dammann et al. | 34/152 |

FOREIGN PATENT DOCUMENTS

| | | |
|---|---|---|
| 1779155 | 9/1971 | Fed. Rep. of Germany . |
| 1704969 | 12/1971 | Fed. Rep. of Germany . |
| 2047640 | 6/1972 | Fed. Rep. of Germany . |
| 2446138 | 4/1976 | Fed. Rep. of Germany . |
| 2706927 | 8/1978 | Fed. Rep. of Germany . |
| 2451415 | 10/1980 | France . |
| 0123626 | 7/1984 | Japan ................ 264/346 |
| 09095762 | 9/1962 | United Kingdom ........ 264/346 |
| 1174865 | 12/1968 | United Kingdom . |
| 1400552 | 7/1975 | United Kingdom . |

OTHER PUBLICATIONS

International Search Report dtd. Feb. 14, 1986 (Sch. completed Jan. 22, 1986).

Primary Examiner—Hubert Lorin
Attorney, Agent, or Firm—Cushman, Darby & Cushman

[57] ABSTRACT

Machined steel blocks 1 and 2 have ridges 20 facing valleys in the opposite block. Polypropylene tape 3 to be heat-treated has sliding contact transversely over each ridge on each block. The blocks are heated by heaters 4. The gap between the blocks is adjustable to suit the material being processed. The gap is large enough so that the tape passing between the blocks is not constrained to deflect from coplanarity by more than its own thickness.

18 Claims, 2 Drawing Sheets

APPARATUS FOR THERMALLY TREATING TAPE

This is a continuation in part of application Ser. No. 144,718 filed Jan. 14, 1988 now abandoned, which in a continuation of 887,102, filed June 18, 1986, now abandoned.

This invention relates to a method and to apparatus for thermally treating long flexible material such as tape or items such as wire, yarn (e.g. monofilament, continuous filament or spun), fabrics (whether woven or nonwoven), continuous tows, thread and fibres and filaments generally (particularly for textiles). The treatment will normally be heating, but cooling would also be possible.

One application is to synthetic (e.g. polypropylene) tape, to which heat treatment is conventionally applied at two stages, firstly draw out the as-extruded tape, and secondly to anneal the drawn-out tape.

Previously, in one known method, tape has been heated by passing it through a hot-air oven. The oven is typically several metres long and, consuming perhaps 40 kW, is costly to heat. Moreover, uniform temperature control is difficult, and temperature variations within the oven are common.

Hot-air ovens depend upon the transfer of heat through a boundary layer of air on the surface of the material being treated. To achieve this transfer at an acceptable rate the circulating air temperature must be raised well above that required in the material. In addition, temperature variations within the mass of circulating air cause product inconsistency. With lighter-weight filamentary materials, air turbulence may cause any broken ends to become entangled in neighbouring material. Hot-air ovens also leak hot air to the surroundings and lose heat by conduction through and radiation from the oven structure. Hot-air ovens also occupy considerable floor area. In an attempt to improve hot air ovens, U.S. Pat. No. 3,720,002 to Martin adds radiant heaters to a hot air oven. This does not diminish its size, but it will increase the already large energy losses.

A second known heating method is infra-red radiant heating. An example of this is taught in U.S. Pat. No. 2,674,809 to Meinhofer.

Infra-red radiation equipment, though simpler in design and cheaper than hot-air ovens, imposes a high energy demand. The radiating heat passes to all protrusions within the equipment itself and not just to the material being treated. Performance of the radiating elements falls off with age, and this introduces difficult control problems. How well material being treated absorbs radiant energy also varies considerably from one polymer batch formulation to another and even within any one batch: this results in more variability in product physical properties.

A third known method is to pass the tape over heated rollers or hot rotating drums. These may require complicated bearings, rotating seals for any heating oil circuitry present and careful temperature control, and thus can be expensive. The use of a number of heated cylinders, usually running at progressively higher surface speeds, gives generally good temperature distribution and a consistent product, but incurs considerable energy loss from surface radiation all round the cylinder. Only a limited portion of the surface acts to heat the material itself. A good example of apparatus exhibiting many of both the advantages and disadvantage mentioned is disclosed in U.S. Pat. No. 4,042,569 to Bell.

A fourth known method is to draw the tape under tension over a convex ('hog's back') heated metal surface, the tape remaining in uninterrupted contact with the surface for a distance of typically 2–3 m, (which it covers in about 1 second). Such a method is described in U.S. Pat. No. 2,495,053 to Conaway. Since the non-contacting surface of the tape is visible throughout, its dimensional changes during its drawing can be readily observed. However, heat transfer in this method can only be from one side, and this will result in uneven heat treatment as between bottom and top of the tape. The tape may accordingly relax with a slight lateral curl, which is inconvenient when (as is usual) a flat tape is in fact wanted. In addition, if the guide groove of Conaway is omitted, though tapes may be closely spaced side-by-side as they come onto the surface, after they have 'necked' (been strained by the heat and tension) they open up gaps between them; in this way, the heated metal surface suffers considerable losses of heat by radiation and convection.

Thus all these four methods of heat treatment suffer from poor energy utilisation and other disadvantages.

According to the present invention, a method of thermally treating long flexible material comprises passing it between two opposed profiled heated or cooled members, the spacing between the members being sufficiently close that the material contacts each member at a plurality of locations.

Also according to the invention, apparatus for thermally treating long flexible material such as tape comprises two opposed profiled members between which material may be passed, the members being spaced sufficiently closely that material passing between them would touch each member at a plurality of locations, the apparatus further comprising means for heating or cooling the members.

Preferably the profile of the members is ridges and valleys running generally transversely to the direction of passage of the material. "Transversely" is intended to include any substantially non-zero angle, although angles in the region of 90° are best. Preferably the ridges of one member face the valleys of the opposite member. Preferably the spacing between the members is sufficiently large that the material can pass between them without being constrained to deflect from coplanarity by more than its own thickness, more preferably ¼ of its thickness. Usually, the ridges where contacting the material are generally smooth, and may be flat plateaux or domed; sharp edges contacting the material could snap or tear it.

Preferably, each member has at least ten ridges for contacting the material.

Preferably, the residence time of any point on the material between the members is 0.01 to 0.2 seconds, more preferably 0.02 to 0.1 seconds.

The material may be synthetic (e.g. polyester or polyolefin) tape.

For polyolefin tape, preferably the members are heated to 125 to 145C, and for drawing out the tape, the ratio (speed leaving the members):(speed entering the members) is preferably from 2:1 to 30:1, more preferably 4:1 to 20:1, most preferably from 5:1 to 10:1. For relaxing (annealing) the polyolefin tape, the members may be heated to 135 to 155C and the ratio (speed leaving the members):(speed entering the members) is preferably from 0.85:1 to 0.97:1. For sequential drawing and relaxing, the temperature of the relaxing members may be 5° to 20C° more than the drawing members.

Optionally several tapes are treated by the method side-by-side, the tapes possibly being formed by slitting a wide film or sheet before the drawing step. As another possibility, several monofilaments, possibly from the same spinneret, are treated by the method side-by-side, and the monofilaments may be twisted together after the relaxing step. For bulking the resulting yarn as mentioned later, a different temperature may be applied during the drawing (i.e. before the twisting) to some of the monofilaments.

The ridges of the members may be parallel but need not be. The ridges may be of constant or varying pitch and height. The two members may be mounted such that the spacing between them can be adjusted, preferably between: a setting wherein the plane defining the outer extent of the profiling of one member coincides with the plane defining the outer extent of the profiling of the opposing member and: a wider setting, and preferably adjustable independently at the entry and exit ends. The members may be substantially of metal e.g. ferrous metal such as mild steel or spheroidal graphite iron and are equipped with cooling and/or heating means, such as drillings for flow of thermal liquid, or suit the material, such as (for example for polypropylene) from 125C to 155C. The members may have a (usually convex) chamfered edge parallel to the tape transport direction, to make for ease of rethreading.

Usually, the apparatus will further comprising means for material transport generally in line with the gap between the members and generally transverse to the ridges. Usually the means of the transport can pull material out of the members at a speed from 0.85 to 30 times the speed at which it feeds the material into them, and to perform the method set forth above, preferably the speeds ratio is in the range (2 to 30) or (4 to 20) or (5 to 10):1 or is in the range (0.85 to 0.97):1.

In this method and apparatus, suitably adapted as necessary, woven fabric can be treated, even if the fabric incorporates irregularities. The apparatus and method could be used for drying various yarns or fabrics from ribbons to broadloom fabric.

Plant may comprise two sets of such apparatus, the first apparatus operating at a speeds ratio of 2 to 30:1 and the second apparatus operating at a speeds ratio of 0.85 to 0.97:1, for sequential drawing and relaxing as already mentioned. For further integration, the plant may also have an extruder for forming a sheet to be transported into the first apparatus, which may include a sheet slitter (for forming tapes side-by-side) before the material enters the members. Alternatively the plant may have a spinneret forming several (e.g. thousands) of separate monofilaments, which may be wound for sale and use directly, or the plant may twist together (usually in groups) the monofilaments passing out of the second apparatus, with an optional transversely segmented member for applying a different temperature to some of the monofilaments to impart differential reheating shrinkage whereby, a subsequent reheating, to bulk the yarn.

Thus the method and apparatus and plant set forth may draw and/or relax (anneal) tape, yarn, filament or fibre and/or the heat-treatment may heat-set fabric and yarns e.g. air-textured tow and/or may be used in the production of for example high-bulk hand-knitting yarns by providing means for imparting differential shrinkage of different treated tow to bulk it up.

The method and apparatus may be adapted for multistage drawing, multistage relaxing or other multistage heat treatment.

Figure 2:
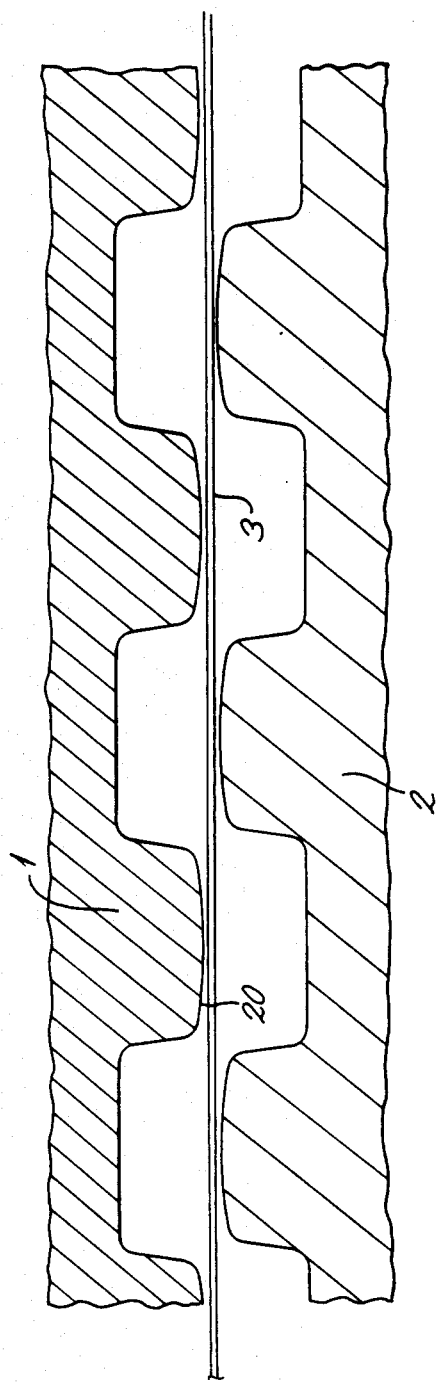
Figure 3:
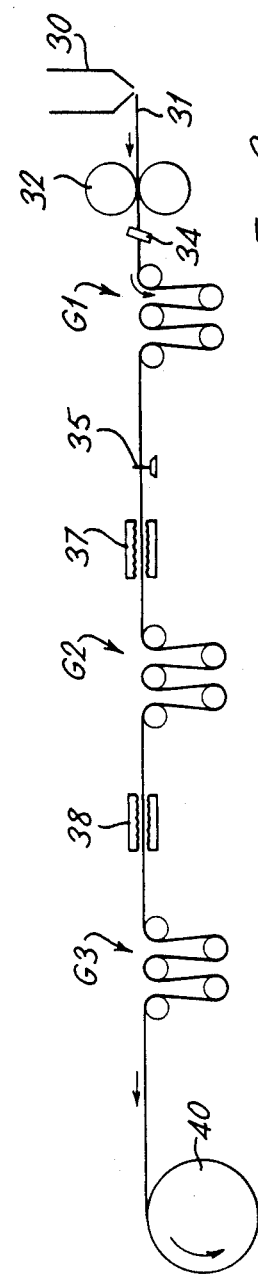

The invention will now be described by way of example with reference to the accompanying drawings, of which:

FIG. 1 shows the method according to the invention being performed by apparatus (of which part is removed for clarity) according to the invention, FIG. 2 is a cross-section of a part of a machined block (alternative to that described hereinafter in relation to FIG. 1) in apparatus according to the invention, and FIG. 3 is a schematic view of plant according to the invention.

In FIG. 1, two identical mild steel cast and machined blocks 1 and 2 are fixed opposing each other, i.e. face to face, but not touching. Part of the block 1 is cut away for clarity. Chamfers 1a and 2a on the blocks 1 and 2 respectively form a groove leading to the gap between the blocks. Each block has five machined parallel curved ridges 20 semi-circular in cross-section of diameter 1½ cm, pitch 1½ cm and length 10 cm, and starts with its left-hand edge (facing the ridged face) at the summit of a ridge and its right-hand edge in the valley. The blocks being identical, when they face each other, ridge faces valley and vice versa.

Tape 3 to be heat-treated is introduced between the blocks 1 and 2 sideways down the chamfered groove entry 1a/2a. The blocks are sufficiently close together that the tape has sliding contact over each ridge on each block alternately; frictional drag on the tape may be altered by altering the gap between the blocks.

Four cartridge-type rod electric heaters 4 (only three shown) are inserted in holes drilled in the blocks 1 and 2 and are thermostatically set to 130C. (They are rated at 130 W each). Polypropylene tape initially 6 mm wide by 0.1 mm thick is drawn out of the apparatus at 100 m/min at a draw ratio (speed out:speed in) of 6:1. While with a hot-air oven, the tape emerges having, as theoretically predictable, a thickness of (original thickness)/$\sqrt{}$(draw ratio) and a width of (original width)/$\sqrt{}$(draw ratio), the tape drawn out of this apparatus is relatively wider and thinner.

After the tape is heat-treated and drawn, it is passed through annealing blocks (identical apparatus) at an appropriate higher block temperature and appropriate overfeed (draw ratio of less-than-1:1). If a longer annealing duration is required, a longer block may be provided; alternatively it is very easy to add any desired number of pairs of blocks, which, indeed, could be made as an off-the-shelf item. Cooling blocks could also be added if required.

Ridges would normally be machined out of the solid. The ridges need not be parallel or evenly spaced or of precisely identical heights, although manufacture is easier if they are. Highly polished or sophisticated sliding surfaces may be provided, but carefully machined mild steel is adequate. The ridges may be fairly flat-topped, i.e. may be plateaux, not necessarily having a clearly defined summit. Since the blocks 1 and 2 are unitary and the ridges 20 are immobile, dissipative heat losses from apparatus are minimized. Also the apparatus saves the cost of bearings, rollers, and such like machinery. In other words, the apparatus of this invention is relatively inexpensive to build as compared to conventional apparatus.

In this method and apparatus, woven fabric can be treated, even if it incorporates irregularities. The apparatus and method could be used for drying various yarns or fabrics from ribbons to broadloom fabric.

In FIG. 2, a pair of mild steel machined blocks 1 and 2 are assembled on the same principle as FIG. 1. These blocks are for a larger scale of operation than FIG. 1, being 1 m wide in the direction of the ridges and 250 mm long along the direction of the tape. The ridges 20 have a plateau of about 5½ mm, separated by valleys of about 6½ mm (both measured in the direction of the tape); the valley walls are 2½ mm high and occupy ¼ mm in plan; thus the ridges have a repeat distance of about 5½+¼+6½+¼=12 mm. The valley walls are radiused (¼ mm radius) where they meet the plateaux, which themselves are slightly domed (by about 0.1 mm). After prolonged running under good conditions, the plateaux, out of their 5½ mm in the direction of the tape 3, are seen to be polished by the tape over about 3 mm. Flat-topped plateaux are also satisfactory, provided the aforesaid radiusing is there, or at any rate that no sharp edges are presented to the tape. Thermostatic cartridge heaters (not shown) are inserted at 10 cm intervals in the block, giving a rating of 28 kW/m$^2$; thus the pair of blocks described is rated at 14 kW but in steady use would be expected to consume about 7–8 kW.

In FIG. 3, two pairs of the FIG. 2 block are used, as will be described.

An extruder 30 produces a continuous sheet or film 31 of polypropylene, 960 mm wide and 0.1 mm thick, which is to be formed into treated tape. The sheet passes through chill rolls 32 and is slit by a slitter (an array of parallel mounted blades) into 160 tapes each 6 mm wide, which then pass over a first speed-regulating godet G1. To maintain separation of the tapes, a spacer 35 has guide pins 50 mounted so as to guide the taps to spread laterally slightly.

The tapes then enter the one-metre-wide pair 37 of blocks as described in FIG. 2. The spacing of the blocks is such that the tapes (held taut) are an easy sliding fit at the entry side; the blocks may be adjusted to be slightly closer at the exit side. The tapes are drawn under tension and become much thinner on their 250 mm journey through the block 37, to an extent determined by the speed of the second godet G2. The temperature of the blocks is typically 135C. Tests have shown that the tape surface actually reaches 120C on leaving the blocks 37. To achieve the same result using a conventional hot-air oven and the same speeds for godets G1 and (21 m/min) and G2 (150 m/min), the oven air must be heated to over 160C and the oven must be at least 3 m long. The space saving offered by the very much shorter blocks is very significant. The temperatures of the blocks are chosen by trial and error.

The tapes are then passed through a second pair 38 of blocks, set at 150C to anneal (relax) the tapes, which are transported by a third godet G3 running at 142 m/min to winders 40. The ratios of the godet speeds will be chosen according to the final product requirements. The blocks 38 are identical to the blocks 37 in this example, but in some cases it may be advantageous for the blocks 38 to be longer than 37 in the direction of tape transport.

More detailed results at various godet speeds are set out hereafter, but a further discussion of block spacing is appropriate with reference to FIG. 2. The blocks must not be so close that the plateaux of both blocks intermesh, for then the frictional drag on the tapes is so great that breakages become too frequent. Indeed the planes of the plateaux are preferably just far enough apart that the tape is not forcibly deviated from linearity as it passes between the blocks. In practice, the blocks may be even slightly further apart, as the tape is seen to flutter to make touching contact with both blocks on several plaalteaux at any instant. Without such contact, the advantageous heat transfer afforded by the invention cannot be assured, and thus much greater block spacings would not be acceptable. The best block spacing for a given material will be found by trial and error.

In the drawing stage (blocks 37), the location in the blocks of the actual necking of the tape is remarkably consistent near the entry side. Taking a hot-air oven as the basis for comparison, being today's (1985) most widely used tape heat treatment means, the location within a hot-air oven where necking occurs is found to wander, leading to variations in tape properties as is demonstrated hereinafter.

There now follow tables showing the results from treating this tape by this method at different draw ratios (=speeds ratio G2:G1) and input speeds, in terms of breaking stress (tenacity), breaking strain (elongation) and shrinkage (when reheated later to 130C). The results from a conventional 160C hot-air oven are shown for comparison. The consistency in both tenacity and breaking strain (which can be measured in terms of a statistical function known as CV, the coefficient of variation) can be seen to be much improved. Additionally, in these examples, this tape has a softer feel and clearer appearance than when treated in a hot-air oven.

All the tests reported were performed using polypropylene containing 3 wt % low-density polyethylene, on the apparatus of FIG. 3, or on a conventional 3 m hot-air oven where stated. The annealing in Tables 1–3 was as already described. 'Shrinkage' is a measure of the thermal dimensional stability of the tap, low values indicating greater stability. Unless otherwise stated, G2 ran at 160 m/min.

In place of the winders 40, if monofilaments are treated instead of tapes and if the annealing is at different temperatures for some filaments so that they will shrink differentially on later reheating, a spinner may re-unite groups of the filaments to form hand-knitting multifilament yarns which thus have bulk imparted to them. The different temperatures are achieved by segmenting one of the one-metre-wide annealing blocks 38 into five 20 cm blocks side-by-side each set to a different temperature.

TABLE 1

| Draw ratio (G2:G1) | Temperature of blocks 37 | Denier | Tenacity (g/den) | CV | Breaking strain (%) | CV | Shrinkage (%) |
|---|---|---|---|---|---|---|---|
| 6:1 | 125° C. | 972 | 4.65 | 2.4 | 28.80 | 5.5 | 8.2 |
| 7:1 | 125° C. | 973 | 5.75 | 3.2 | 16.50 | 4.4 | 14.0 |
| 8:1 | 125° C. | 976 | 6.25 | 4.1 | 13.60 | 8.0 | 14.9 |
| 9:1 | 125° C. | 974 | 5.45 | 5.6 | 9.40 | 10.1 | 14.4 |
| 6:1 | 130° C. | 975 | 4.65 | 3.5 | 22.60 | 9.8 | 10.8 |
| 7:1 | 130° C. | 982 | 5.70 | 3.5 | 17.10 | 5.1 | 11.0 |
| 8:1 | 130° C. | 974 | 6.15 | 5.1 | 13.00 | 7.2 | 12.6 |
| 9:1 | 130° C. | 977 | 5.60 | 4.2 | 9.80 | 8.6 | 12.1 |

TABLE 1-continued

| Draw ratio (G2:G1) | Temperature of blocks 37 | Denier | Tenacity (g/den) | CV | Breaking strain (%) | CV | Shrinkage (%) |
|---|---|---|---|---|---|---|---|
| 6:1 | 137° C. | 982 | 4.50 | 2.8 | 18.30 | 8.0 | 14.6 |
| 7:1 | 137° C. | 976 | 5.70 | 2.3 | 16.80 | 5.3 | 16.1 |
| 8:1 | 137° C. | 976 | 6.30 | 3.6 | 13.50 | 5.6 | 16.4 |
| 9:1 | 137° C. | 977 | 5.75 | 7.6 | 9.40 | 10.6 | 16.1 |
| 6:1 | 139° C. | 984 | 4.80 | 1.9 | 18.30 | 5.8 | 13.8 |
| 7:1 | 139° C. | 989 | 5.80 | 3.2 | 16.60 | 8.8 | 14.0 |
| 8:1 | 139° C. | 980 | 6.30 | 5.6 | 13.60 | 10.2 | 14.4 |
| 9:1 | 139° C. | 980 | 5.80 | 7.1 | 10.20 | 9.0 | 13.6 |

TABLE 2

| Draw ratio (G2:G1) | Temperature of blocks 37 | Denier | Tenacity (g/den) | CV | Breaking strain (%) | CV | Shrinkage (%) |
|---|---|---|---|---|---|---|---|
| 6:1 | 130-133° C. | 965 | 5.30 | 2.5 | 18.75 | 9.7 | 15.0 |
| 7:1 | 130-133° C. | 966 | 6.20 | 3.1 | 14.90 | 8.3 | 16.1 |
| 8:1 | 130-133° C. | 945 | 6.50 | 7.1 | 12.60 | 13.0 | 15.8 |
| 9:1 | 130-133° C. | 940 | 5.75 | 10.2 | 8.45 | 12.0 | 14.7 |
| 6:1 | 138-140° C. | 997 | 4.55 | 2.8 | 18.60 | 12.7 | 15.8 |
| 7:1 | 138-140° C. | 1003 | 5.70 | 4.6 | 16.00 | 10.8 | 16.2 |
| 8:1 | 138-140° C. | 1001 | 6.15 | 9.6 | 12.90 | 15.7 | 15.9 |
| 9:1 | 138-140° C. | 1003 | 5.50 | 6.2 | 8.50 | 9.2 | 13.8 |
| 6:1 | 142-145° C. | 1017 | 4.40 | 8.0 | 18.0 | 18.4 | 15.0 |
| 7:1 | 142-145° C. | 967 | 5.85 | 2.9 | 15.8 | 7.7 | 17.1 |
| 8:1 | 142-145° C. | 964 | 6.30 | 4.9 | 14.0 | 4.1 | 16.0 |
| 9:1 | 142-145° C. | 952 | 5.80 | 8.45 | 8.90 | 11.7 | 15.1 |

TABLE 3

Hot-air oven - not according to the invention

| Draw ratio (G2:G1) | Hot-air oven temperature | Denier | Tenacity (g/den) | CV | Breaking strain (%) | CV | Shrinkage (%) |
|---|---|---|---|---|---|---|---|
| 6:1 | 160° C. | 997 | 5.35 | 2.6 | 21.10 | 11.0 | 9.7 |
| 7:1 | 160° C. | 998 | 5.70 | 10.5 | 16.40 | 19.9 | 10.3 |
| 8:1 | 160° C. | 986 | 6.25 | 12.5 | 12.20 | 20.8 | 10.4 |
| 9:1 | 160° C. | 976 | 6.15 | 9.0 | 9.70 | 7.8 | 11.9 |
| 6:1 | 170° C. | 983 | 4.95 | 1.6 | 27.0 | 6.4 | 9.2 |
| 7:1 | 170° C. | 977 | 5.60 | 8.1 | 18.2 | 17.0 | 11.0 |
| 8:1 | 170° C. | 976 | 5.85 | 9.1 | 12.6 | 8.1 | 11.4 |
| 9:1 | 170° C. | 976 | 5.65 | 8.2 | 11.7 | 14.2 | 12.1 |
| 6:1 | 180° C. | 953 | 5.25 | 3.2 | 27.0 | 14.0 | 14.1 |
| 7:1 | 180° C. | 964 | 5.10 | 16.1 | 15.5 | 25.3 | 15.0 |
| 8:1 | 180° C. | 970 | 5.80 | 11.1 | 13.2 | 15.6 | 15.8 |
| 9:1 | 180° C. | 969 | 5.70 | 6.8 | 11.0 | 10.3 | 15.5 |

TABLE 4

Hot-air oven - not according to the invention

| Sample No. | Speeds (m/min) Chill Roll 32 | G1 | G2 | G3 | 1st Oven C | 2nd Oven C | Denier | Tenacity (g/den) | CV | Breaking strain (%) | CV | Shrinkage % |
|---|---|---|---|---|---|---|---|---|---|---|---|---|
| 1 | 20.9 | 21.4 | 150 | 147 | 160 | — | 1008 | 6.38 | 3.9 | 17.8 | 10.0 | 15.4 |
| 2 | 20.9 | 21.4 | 150 | 147 | 170 | — | 1000 | 6.27 | 8.4 | 18.0 | 15.5 | 12.2 |
| 3 | 20.9 | 21.4 | 150 | 147 | 180 | — | 998 | 6.04 | 8.6 | 18.9 | 18.3 | 10.1 |
| 4 | 20.9 | 21.4 | 150 | 142.4 | 170 | 160 | 1032 | 6.40 | 4.2 | 19.9 | 9.2 | 11.4 |
| 5 | 20.9 | 21.4 | 150 | 138.9 | 170 | 160 | 1035 | 6.01 | 7.5 | 19.8 | 12.4 | 11.1 |
| 6 | 20.9 | 21.4 | 150 | 136.5 | 170 | 160 | 1075 | 5.91 | 8.8 | 21.0 | 14.9 | 13.3 |
| 7 | 20.9 | 21.4 | 150 | 142.5 | 170 | 170 | 1028 | 6.10 | 9.8 | 18.3 | 16.9 | 11.0 |
| 8 | 20.9 | 21.4 | 150 | 139.0 | 170 | 170 | 1038 | 6.07 | 9.0 | 20.5 | 14.1 | 12.6 |
| 9 | 20.9 | 21.4 | 150 | 135.0 | 170 | 170 | 1068 | 5.78 | 10.5 | 22.0 | 15.2 | 6.1 |
| 10 | 20.9 | 21.4 | 150 | 142.5 | 170 | 180 | 1016 | 6.15 | 11.2 | 20.1 | 20.8 | 10.0 |
| 11 | 20.9 | 21.4 | 150 | 138.9 | 170 | 180 | 1047 | 6.23 | 6.8 | 22.6 | 10.4 | 7.4 |
| 12 | 20.9 | 21.4 | 150 | 133.8 | 170 | 180 | 1090 | 5.69 | 9.5 | 23.7 | 16.0 | 5.3 |

TABLE 5

According to invention - FIG. 3

| Sample No. | Speeds (m/min) Chill Roll 32 | G1 | G2 | G3 | Blocks 37 (C) | Blocks 38 (C) | Denier | Tenacity (g/den) | CV | Breaking strain (%) | CV | Shrinkage (%) |
|---|---|---|---|---|---|---|---|---|---|---|---|---|
| 15 | 20.9 | 21.4 | 150 | 142.4 | 130 | 135 | 1014 | 6.10 | 4.0 | 18.0 | 10.2 | 15.0 |
| 14 | 20.9 | 21.4 | 150 | 139.0 | 130 | 135 | 1040 | 5.40 | 4.2 | 19.6 | 12.5 | 13.2 |
| 15 | 20.9 | 21.4 | 150 | 137.2 | 130 | 135 | 1042 | 5.78 | 3.8 | 14.8 | 6.2 | 11.2 |
| 16 | 20.9 | 21.4 | 150 | 142.5 | 130 | 145 | 1014 | 6.15 | 3.4 | 18.8 | 8.3 | 14.0 |

TABLE 5-continued

| | According to invention - FIG. 3 | | | | | | | | | | | |
|---|---|---|---|---|---|---|---|---|---|---|---|---|
| | Speeds (m/min) | | | | | | | | | | | |
| Sample No. | Chill Roll 32 | G1 | G2 | G3 | Blocks 37 (C) | Blocks 38 (C) | Denier | Tenacity (g/den) | CV | Breaking strain (%) | CV | Shrinkage (%) |
| 17 | 20.9 | 21.4 | 150 | 136.8 | 130 | 145 | 1026 | 6.12 | 3.0 | 14.7 | 6.6 | 12.3 |
| 18 | 20.9 | 21.4 | 150 | 136.2 | 130 | 145 | 1026 | 6.0 | 3.2 | 21.3 | 6.5 | 11.0 |
| 19 | 20.9 | 21.4 | 150 | 142.3 | 130 | 150 | 1018 | 6.14 | 5.5 | 14.4 | 8.4 | 12.4 |
| 20 | 20.9 | 21.4 | 150 | 138.7 | 130 | 150 | 1043 | 5.72 | 5.1 | 18.4 | 10.5 | 10.6 |
| 21 | 20.9 | 21.4 | 150 | 135.5 | 130 | 150 | 1026 | 5.76 | 3.6 | 19.5 | 5.8 | 9.8 |
| 22 | 20.9 | 21.4 | 150 | 146.5 | 130 | — | 972 | 6.03 | 5.1 | 18.2 | 9.8 | 18.0 |
| 23 | 20.9 | 21.4 | 150 | 146.5 | 137 | — | 962 | 5.92 | 4.3 | 18.4 | 10.3 | 14.6 |
| 24 | 20.9 | 21.4 | 150 | 146.5 | 145 | — | 963 | 5.81 | 4.4 | 20.1 | 6.8 | 11.8 |

I claim

1. Apparatus for thermally treating long flexible material such as tape, comprising:
two opposed spaced unitary immobile profiled members between which material may be passed, the profile of said members being ridges and valleys running generally transversely to the direction of passage of the material, said ridges of one of said members facing said valleys of the opposing member, said member being spaced sufficiently closely that material passing between them would touch each member at a plurality of locations yet being spaced sufficiently far apart that the material can pass between them without being constrained to deflect from coplanarity by more than its own thickness; and
including means for heating or cooling said members.

2. Apparatus according to claim 1, wherein the means for heating or cooling the members are passages within the members for flow of thermal fluid.

3. Apparatus according to claim 1, wherein the means for heating are heaters on or within the members and including thermostats controlling said heaters.

4. Apparatus according to claim 1, wherein the members are mounted such that the spacing between them can be adjusted between
(a) a setting wherein the plane defining the outer extent of the profiling of one of said members coincides with the plane defining the outer extent of the profiling of the opposing member, and
(b) a wider setting.

5. Apparatus according to claim 4, wherein the spacing can be adjusted independently at the entry and exit ends of the passage between the members through which material is passed.

6. Apparatus according to claim 1, wherein the members have a chamfered edge parallel to the direction of passage to facilitate rethreading.

7. Apparatus according to claim 1. wherein the members are substantially of metal.

8. Apparatus according to claim 7, wherein the metal is ferrous.

9. Apparatus according to claim 1, wherein the ridges where intended to contact the material are substantially smooth.

10. Apparatus according to claim 1, wherein each member has at least ten of said ridges for contacting the material.

11. Apparatus according to claim 1, further comprising means to transport material generally in line with the gap between the members and generally transverse to the ridges.

12. Apparatus according to claim 11, wherein the transport means can pull material from between the members at a speed from 0.85 to 30 times the speed at which said transport means feeds the material between said members.

13. Apparatus according to claim 12, wherein the speeds ratio is 5 in the range (2 to 30):1 or is in the range (0.85 to 0.97):1.

14. Apparatus for treating long flexible material such as tape, comprising:
two sets in tandem of apparatus comprising:
two opposed spaced unitary immobile profiled members between which material may be passed, the profile of said members being ridges and valleys running generally transversely to the direction of passage of the material, said ridges of one of said members facing said valleys of the opposing member, said members being spaced sufficiently closely that material passing between them would touch each member at a plurality of locations yet being spaced sufficiently far apart that the material can pass between them without being constrained to deflect from coplanarity by more than its own thickness;
means for heating or cooling said members; and
means to transport the material generally in line with the gap between said members and generally transverse to said ridges, the first apparatus operating at a speeds ratio of 2 to 30:1 and the second apparatus operating at a speeds ratio of 0.85 to 0.97:1, said ratios being the range of speeds at which said transport means pulls the material from between the members relative to the speed at which said transport means feeds the material between said members.

15. Apparatus according to claim 14, further comprising:
an extruder for forming a sheet to be transported into the first apparatus; and
a slitter for dividing the sheet into tapes.

16. Apparatus according to claim 14, further comprising:
a spinneret for forming a plurality of filaments to be transported into the first apparatus.

17. Apparatus according to claim 16, further comprising:
means for twisting together the filaments passing out of the second apparatus.

18. Apparatus according to claim 17, wherein at least one of the members is transversely segmented, for applying a different temperature to some of the filaments.

* * * * *